United States Patent
Goh et al.

(10) Patent No.: US 12,207,036 B2
(45) Date of Patent: Jan. 21, 2025

(54) SYSTEM AND METHOD FOR CONTROL OF AUDIO SWITCHING AT A LINKED INPUT/OUTPUT DEVICE BETWEEN TWO ACTIVE HOSTS

(71) Applicant: Dell Products, LP, Round Rock, TX (US)

(72) Inventors: Peng Lip Goh, Singapore (SG); Deeder M. Aurongzeb, Austin, TX (US); Sok Hui Khoo, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 261 days.

(21) Appl. No.: 17/863,810

(22) Filed: Jul. 13, 2022

(65) Prior Publication Data

US 2024/0022847 A1 Jan. 18, 2024

(51) Int. Cl.
*H04R 1/10* (2006.01)
*H04R 1/04* (2006.01)
*H04W 4/80* (2018.01)

(52) U.S. Cl.
CPC ............. *H04R 1/1041* (2013.01); *H04R 1/04* (2013.01); *H04W 4/80* (2018.02); *H04R 2420/07* (2013.01)

(58) Field of Classification Search
CPC .... H04R 1/1041; H04R 1/04; H04R 2420/07; H04R 2201/107; H04R 2420/03; H04W 4/80
See application file for complete search history.

(56) References Cited

U.S. PATENT DOCUMENTS

| | | | |
|---|---|---|---|
| 2008/0225830 A1* | 9/2008 | Ding | H04M 1/2535 370/352 |
| 2020/0092641 A1* | 3/2020 | Smus | H04W 4/80 |
| 2022/0174392 A1* | 6/2022 | Jorgovanovic | H04R 1/1091 |
| 2023/0208892 A1* | 6/2023 | Goldfish | G06F 13/102 455/41.2 |

\* cited by examiner

*Primary Examiner* — Akelaw Teshale
(74) *Attorney, Agent, or Firm* — Prol Intellectual Property Law, PLLC; H. Kenneth Prol

(57) ABSTRACT

A wireless speaker and microphone device paired with a plurality of host information handling systems comprising a microphone and a speaker, a wireless speaker and microphone device radio system establishing a first wireless link with a first host information handling system and establishing a second wireless link with a second host information handling system where the wireless speaker and microphone device receives a first active audio data stream on the first wireless link. The microcontroller integrated circuit to receives a signal on the second wireless link indicating an incoming available second audio data stream and provides an indication of the incoming available second audio data stream to a user. An input/output device receives an acceptance from the user and the microcontroller integrated circuit switches the speaker and the microphone to the second wireless link and sends a signal to activate the second audio data stream on the second wireless link.

20 Claims, 5 Drawing Sheets

SYSTEM AND METHOD FOR CONTROL OF AUDIO SWITCHING AT A LINKED INPUT/OUTPUT DEVICE BETWEEN TWO ACTIVE HOSTS

FIELD OF THE DISCLOSURE

The present disclosure generally relates to wireless speaker and microphone devices, such as earbuds and headphones. More specifically, the present disclosure relates to a system for controlling the switching of an active audio stream, such as a call on one linked host device to an active audio stream from a second linked host device such as between a headset and plural, linked mobile information handling systems.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, wearable peripheral device, touchpad, speakers, earbud, headphone, microphone, or other peripheral devices. Similarly, a peripheral input/output device such as an earbud, headphone, microphone or other peripheral device may be operatively coupled or linked with plural information handling systems for receiving or transmitting audio streams.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
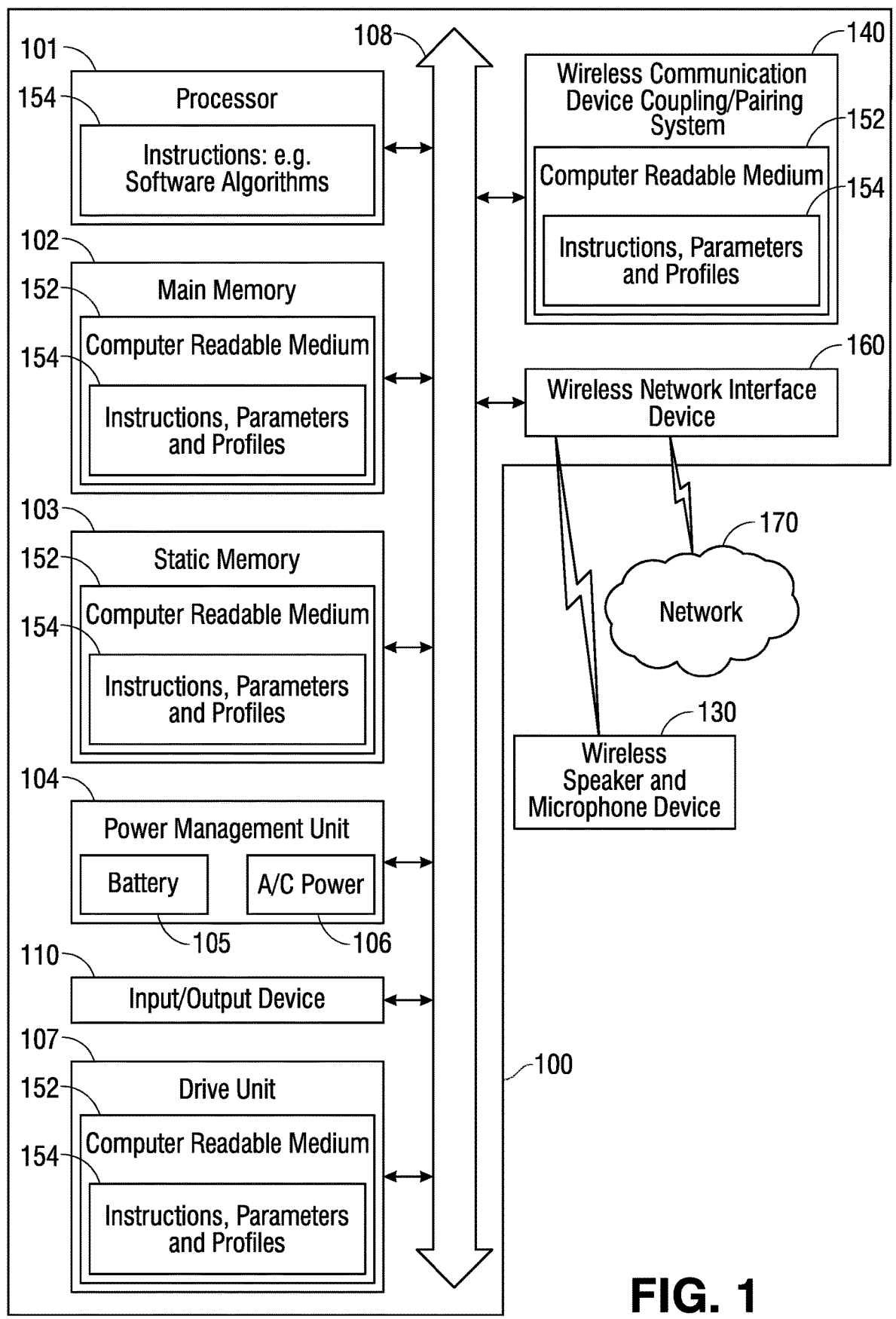
FIG. 1 is a block diagram illustrating an information handling system operatively coupled to a wireless speaker and microphone device according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of mobile information handling systems such as smart phones, tablets, or laptops may employ one or more peripheral wireless speaker and microphone devices (e.g., earbuds, headphones, smart speakers) located remotely from the mobile information handling system to transmit and receive streaming audio data such as streaming music, streaming podcasts, phone calls, or online meetings (e.g., through Zoom®, or Microsoft® Teams®). In some embodiments, a peripheral wireless speaker and microphone device may have plural uses and plural radios to be wirelessly linked to multiple host information handling systems to receive or transmit audio streams. A first active audio data stream may begin with a first mobile information handling system, for example, acting as a primary source of audio data streaming input and output for a wireless speaker and microphone device (e.g., earbuds or a headset). In some embodiments, a second mobile information handling system may become active, such as via an incoming call to a mobile smartphone, and may activate a wireless link with the peripheral wireless speaker and microphone device. In previous systems, the second, or later-activated incoming active audio data stream may take precedence and interrupt or pause the first active audio data stream from the first mobile information handling system. The second incoming active audio data stream may take over the peripheral wireless speaker and microphone device which may not be a desirable experience for the user. This may occur when both host information handling systems communicate with the peripheral wireless speaker and microphone device via the same wireless protocol. A system is needed to provide the user switching control over transitioning between a first active audio data stream via a first wireless link with a first host and a later, second active audio data stream via a second wireless link with a second host.

The embodiments of the present application describe an audio device switching control system for a peripheral wireless speaker and microphone device that is wirelessly linked to plural host information handling systems. The peripheral wireless speaker and microphone device may a microcontroller unit and a headset wireless chip which may execute firmware or software code instructions of the audio switching device of the present embodiments. The user may wish to have control of which active audio data stream is active on the wireless speaker and microphone device (e.g., earbuds or a headset) when two hosts wirelessly linked to the wireless speaker and microphone device have active audio data streams for wireless communication.

In the embodiments of the present disclosure, a second active audio data stream, such as an incoming call, from a host may be held off and a signal sent from the second host information handling system to the wireless speaker and microphone device. The signal from the second host information handling system provides for an indication to the user, such as a tone or haptic feedback on the wireless speaker and microphone device, that a second active data stream is available in an embodiment. This happens without the second active audio data stream causing an interruption with the first active audio data stream playing or live on the wireless speaker and microphone device. This provides the user with an opportunity to choose to interrupt the first active audio data stream and actively link to the second active audio data stream or to ignore the second active audio data stream and continue with the first active audio data stream via an input to the wireless speaker and microphone device. In an embodiment, this input may be via a capacitive touch, button, switch, or other input structure where the user may indicate a desire to switch to the second active audio data stream from a second host information handling system in various embodiments. Further, the audio device switching control system executing on the wireless speaker and microphone device may provide a user control as well to switch back from the second active audio data stream from the second host to the first active audio data stream from the first host. For example, the audio device switching control system may receive input from an input device on the wireless speaker and microphone device such as a capacitive switch, a button, or other switch to switch back to a first active audio data stream from the first host information handling system when an incoming call on the second active audio data stream has ended.

The wireless coupling between the wireless speaker and microphone device and the first or second host information handling systems may be via one or multiple wireless protocols. For example, a pairing and a wireless link may be conducted under a Bluetooth® (BT) or Bluetooth Low Energy (BLE) wireless protocol with one or either of the host information handling systems. In another example embodiment, a wireless coupling may be via a dongle on proprietary wireless communication link, via BT, via BLE, via Wi-Fi, or via a 5G wireless link between the wireless speaker and microphone device and one or either host information handling systems. Any wireless protocol may be supported and one or more radio systems for plural wireless protocols may be available on the wireless speaker and microphone device to support one or more wireless links with multiple host information handling systems in embodiments herein.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication and may serve as a host for an active audio data stream for wireless communication to a wireless speaker and microphone device. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Each information handling system 100 in an embodiment is operably coupled to one or more wireless speaker and microphone devices 130 and capable of wirelessly receiving and transmitting audio data, such as a voice call or streaming audio content (e.g., podcast, music, etc.) via a link via the wireless network interface device 160 of information handling system 100. In some embodiments, the wireless speaker and microphone device 130 may comprise a wearable hearing device that a user may position in or around the user's ears, such as earbuds or headphones. In other embodiments, the wireless speaker and microphone devices 130 or 180 may comprise a smart speaker system (e.g., Alex® Echo® or Dot®, or Google® Mini-Home® devices), or a tablet, desktop, or laptop computing device. As described, information handling system 100 may be any mobile information handling system, such as a smart phone, tablet, or laptop, operating as a host information handling system to wirelessly link with a wireless speaker and microphone device 130 and transceive an active audio data stream via that wireless link.

The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, a static memory 103 or drive unit 107 or other components of an information handling system. The information handling system 100 may also include one or more buses (e.g., 108) operable to transmit communications between the various hardware components. Portions of an information handling system 100 may themselves be considered information handling systems 100 in the embodiments presented herein.

The wireless network interface device 160 in an embodiment may be capable of communication between the information handling system and network 170 (e.g., LAN, WLAN, WAN, WLAN) in some embodiments. Further, wireless network interface device 160 may be capable of communication with the paired wireless speaker and microphone device 130 using a wireless link established using Near Field Communication (NFC), or Bluetooth® technology such as Bluetooth® (BT) or Bluetooth Low Energy (BLE) protocols, for example. The wireless network interface device 160 in an embodiment may transmit and receive information necessary to pair the wireless speaker and microphone device 130 with the information handling system 100, such as, for example, pairing or wireless communication profiles for the information handling system 100 and the wireless speaker and microphone device 130. Such pairing or wireless communication profiles may operate to identify the wireless speaker and microphone device 130 as a device authorized to transceive data with the information handling system 100, as well as information sufficient to identify the wireless speaker and microphone device 130, such as a Media Access Control (MAC) address, IP address. The pairing or wireless communication profiles in an embodiment may further store various types of information necessary to perform a handshake between at least one wireless speaker and microphone device 130 and the information handling system 100, such as various public keys, private keys, hashing algorithms, short-term keys, long-term keys, or encryption/decryption algorithms. Further, the network interface device 160 in an embodiment may establish a wireless link with the network 170 to conduct an active audio data stream from a remote source such as an ongoing call, virtual meeting, or audio streaming from an online audio streaming service.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include a wireless communication device pairing system 140, operating system (OS) software, application software, BIOS software, or other software applications or drivers detectable by processor type 101.

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

Information handling system 100 in an embodiment may be in communication, via a wireless network interface device, with a wireless speaker and microphone device 130 such as earbuds, headphones, smart speakers, tablets, laptops or desktop computing devices, as described in greater detail herein. The information handling system 100 in such an embodiment may operate on wired and wireless links to connect with the network 170 via a network Access Point (AP) or base station, as described in greater detail herein.

The network interface device 160 may provide connectivity of the information handling system 100 as a host of at least one active audio data stream to an operatively coupled wireless input/output devices such as wireless speaker and microphone device 130. For example, the wireless network interface device 160 may establish a first wireless link directly to the wireless speaker and microphone device 130. In some embodiments, another wireless link directly to the wireless speaker and microphone device 130, or any number of additional wireless links to the wireless speaker and microphone device 120 may be established by other host information handling systems in embodiments herein. Further, wireless links may be established among plural wireless speaker and microphone devices 130 in some embodiments. Such wireless links may be established pursuant to the Bluetooth® or Bluetooth Low Energy® (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) (e.g., 170) in which the information handling system 100 may communicate wirelessly with any wireless speaker and microphone devices (e.g., 130 and 180) paired to the PAN 170 using a Bluetooth® compliant pairing and wireless communication profile. The PAN 170 in such an embodiment may communicate data between the information handling system 100 and any paired wireless speaker and microphone devices (e.g., 130 and 180) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) and any revision of those protocols.

The network interface device 160 may provide connectivity of the information handling system 100 to the network 170 via a dedicated link, to a network AP or base station in an embodiment. In another embodiment, network interface device 160 may provide connectivity of the information handling system 100 to one or more wireless peripheral input/output devices 110 such as a wireless speaker and microphone device 130. Connectivity to the wireless speaker and microphone device 130 may be with a headset or earbuds in an example embodiment and may be via a BT or BLE wireless link or a proprietary wireless link such as at 2.4 GHz as well as via any near field communication link or other wireless link to establish a wireless link or a wireless personal area network between the information handling system 100 and one or more wireless peripheral input/output devices 110 such as a wireless speaker and microphone device 130. The network 170 in some embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection.

In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of a wireless communication device pairing system 140, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

A wireless communication device coupling system 140 may utilize a computer-readable medium 152 in which one or more sets of instructions 154 may operate in part as software or firmware instructions executed on the information handling system 100. The instructions 154 may embody one or more of the methods or logic as described herein. For example, instructions relating to the wireless communication device coupling system 140, firmware or software algorithms, processes, and/or methods may be stored here and may execute to pair or otherwise establish a wireless link in coordination with wireless network interface device 160 with a wireless peripheral device such as one or more wireless peripheral input/output devices 110 including a wireless speaker and microphone device 130 or with a network 170 according to embodiments herein. More specifically, instructions 154 may be executed by the processor 101 or other processing resources such as an embedded controller (EC), wireless controller in the wireless network interface device 160 or other controller integrated circuit to pair or otherwise establish and manage a wireless link between the wireless speaker and microphone device 130 and the information handling system 100 according to embodiments herein. Such instructions 154 may comprise transmitting pairing or wireless communication profiles for the information handling system 100 and receiving pairing or wireless communication profiles for the wireless speaker and microphone device 130. The instructions 154 may further operate to perform various types of handshakes or encryption/decryption using various public keys, private keys, hashing algorithms, short-term keys, long-term keys, or encryption/decryption algorithms stored in the shared pairing or wireless communication profiles. Via the network interface device 160, in an embodiment, a wireless controller, the processor 101 or another processing resource such as an embedded controller (EC) or other controller integrated circuit may execute code instructions 154 of the wireless communication device pairing system 140 to establish a wireless link with the network 170 to receive in some embodiments an external active audio data stream from a remote source such as a call, virtual meeting or an online streaming service as well as establish a wireless link with wireless speaker and microphone device 130 for user to receive or interact with that active audio data stream.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the wireless communication device pairing system 140 may be stored in static memory 103, or the drive unit 107 on a computer-readable medium 152 such as a flash memory or magnetic disk in an example embodiment. More specifically, computer readable medium 152 in an embodiment may store pairing or wireless communication profiles for identifying the wireless speaker and microphone device 130 as a device authorized to transceive data with the information handling system 100, as well as information sufficient to identify the wireless speaker and microphone device 130, such as a Media Access Control (MAC) address, IP address. The pairing or wireless communication profiles in an embodiment may further store various types of information necessary to perform a handshake between the wireless speaker and microphone device 130 and the information handling system 100, such as various public keys, private keys, hashing algorithms, short-term keys, long-term keys, or encryption/decryption algorithms. Any of such pairing or wireless communication profiles established for the wireless speaker and microphone device 130 may be cloned, in some embodiments, and transmitted to any additional wireless speaker and microphone devices within communication range of the first wireless speaker and microphone device 130. In other embodiments, multiple pairing or wireless communication profiles established for the wireless speaker and microphone device 130 and other wireless input/output devices including other wireless speaker and microphone devices, via a wireless link such as a Bluetooth® pairing or a proprietary wireless link via a dongle (e.g., utilizing an available wireless frequency such as 2.4 GHz in one example) between the wireless speaker and microphone device and the information handling system 100 as described in greater detail herein. After establishing a pairing and wireless communication profile in an embodiment, the information handling system 100 may begin transceiving an active audio data stream with the first wireless speaker and microphone device 130. Upon user selection of the second information handling system to receive a second active audio data stream at the wireless speaker and microphone device 130, the first audio data stream may continue actively outputting from the first host information handling system to the wireless speaker and microphone device 130 but may be turned off or switched off at the wireless speaker and microphone device 130 for a second active audio data stream from the second information handling system 100 if selected to switch by the user at the wireless speaker and microphone device 130. Thus, the second host information handling system 100 may begin transceiving the second active audio data stream to the wireless speaker and microphone device 130 which may be switched to active for the speaker and microphone at the wireless speaker and microphone device 130. As such, the first active audio data stream can be switched over to a second active audio data stream at the wireless speaker and microphone device 130 with control by the user via the audio device switching control system executing on the wireless speaker and microphone device 130 without intervention by the user on either the first information handling system 100 or the second information handling system (e.g., via a GUI).

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
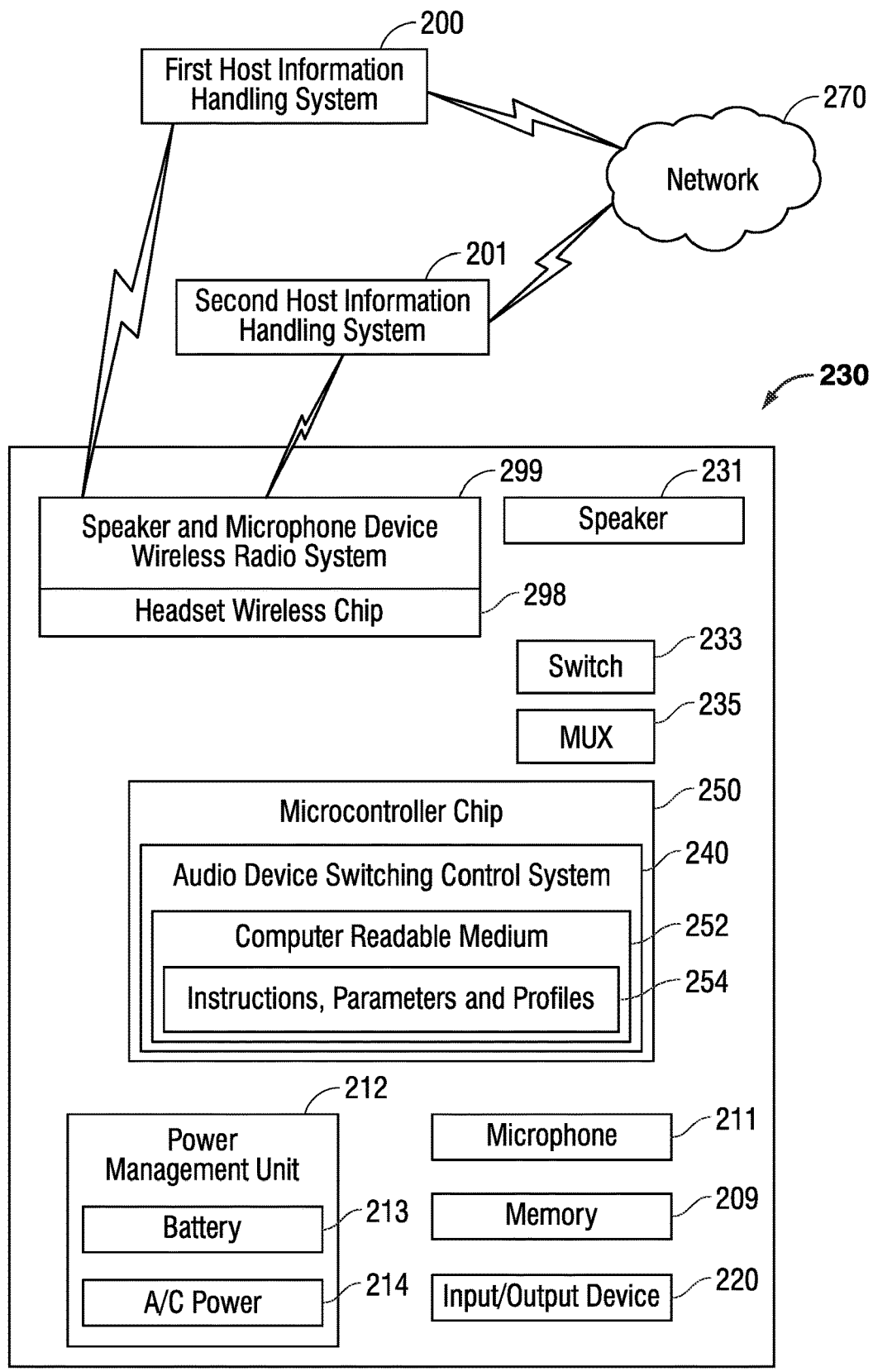
FIG. 2 is a block diagram illustrating a wireless speaker and microphone device wirelessly coupled to two host information handling systems and executing an audio device switching control system according to an embodiment of the present disclosure.

FIG. 2 is a block diagram illustrating a wireless speaker and microphone device 230 operably coupled to a plurality of host information handling systems 200 and 201 according to an embodiment of the present disclosure. The first host information handling system 200 in an embodiment is operably coupled to a wireless speaker and microphone device 230 capable of wirelessly receiving and transmitting a first active audio data stream, such as a voice call or streaming audio content (e.g., podcast, music, etc.) via a link with the speaker and microphone device wireless radio system 299. In an embodiment, the wireless speaker and microphone device 230 may be shared between plural host information handling systems 200, 201. Thus, the second host information handling system 201 in an embodiment is also operably coupled to the wireless speaker and microphone device 230 capable of wirelessly receiving and transmitting a second active audio data stream, such as a voice call or streaming audio content (e.g., podcast, music, etc.) via a link with the speaker and microphone device wireless radio system 299. The first and second host information handling systems 200 and 201 may also be wirelessly coupled to network 270 for receiving or transmitting active audio data streams, such as a video conference call, a voice call, or streaming audio content via network 270 in some embodiments. In some embodiments, the wireless speaker and microphone device 230 may comprise a wearable hearing device that a user may position in or around the user's ears, such as earbuds or headphones. In other embodiments, the wireless speaker and microphone device 230 may comprise a smart speaker system (e.g., Alex® Echo® or Dot®, or Google® Mini-Home® devices), or a tablet, desktop, or laptop computing device. Such a wireless speaker and microphone device 230 in an embodiment may house a microphone 211 for recording a user's voice and a speaker 231 for outputting or playing audio data received from the either the first host information handling system 200 or the second host information handling system 201 and which may come in some embodiments from a remote source in the network 270.

A power management unit 212 with a battery 213 or A/C power charging adapter 214 may be on the wireless speaker and microphone device 230 to provide power to the microcontroller chip 250, the speaker 231, the microphone 211, a switch 233, a multiplexer (MUX) chip 235, a headset wireless chip 298, the speaker and microphone device wireless radio system 299, an analog or digital switch, or other components of the wireless speaker and microphone device 230. An input/output device 220, such as a push button, a voice assistant, digital display, capacitive or resistive touch switch, or physical switch, for example, may allow the user to indicate a desire to switch between a first active audio data stream from the first host information handling system 200 and a second active audio data stream from the second host information handling system 201 that is played or provided to the speaker 231 and microphone 211 of the wireless speaker and microphone device 230. Further, input/output device 220 may comprise a device to provide indication to a user such as an audible feedback (e.g., alarm, buzzer, or voice indicator), haptic feedback (e.g., a buzzer, piezo element, linear resonator, or other haptic element), or provide visible (e.g., light flashing a certain color) to a user that a second active audio data stream is available to the wireless speaker and microphone device 230 from the second host information handling system 201 according to embodiments herein. In some embodiments, the second host information handling system 201 may be the same type of device as the first information handling system 200. Further, the first host information handling system 200 and the second information handling system 201 may wirelessly couple via the same wireless protocol or different wireless protocols with the wireless speaker and microphone device 230 in various embodiments, but may depend on the radio capabilities of the speaker and microphone device wireless radio system 299 and headset wireless chip 298.

In an embodiment, the wireless speaker and microphone device 230 may include a microcontroller chip 250 that may be any device or devices that execute instructions, parameters, and profiles 254 and may have associated computer readable medium 252 for storage of code instructions of an audio device switching control system 240 to facilitate controlled switching by a user between a plurality of incoming active audio data streams from plural host information handling systems wirelessly coupled to the wireless speaker and microphone device 230. More specifically, instructions 254 may be executed by the microcontroller chip 250, for example a controller integrated circuit, to pair or otherwise operatively couple the wireless speaker and microphone device 230 with the first host information handling system 200 in a first wireless link coupling them and manage the first active audio data stream from that first wireless link. Further, instructions 254 may be executed by the microcontroller chip 250, for example a controller integrated circuit, instructions 254 may be executed by the microcontroller chip 250, for example a controller integrated circuit, to pair or otherwise operatively couple the wireless speaker and microphone device 230 with the second host information handling system 201 in a second wireless link coupling them and manage the second available active audio data stream from that second wireless link at the wireless speaker and microphone device 230.

Such instructions 254 may comprise transmitting pairing or wireless communication profiles for the information handling system 200 and receiving pairing or wireless communication profiles for the wireless speaker and microphone device 230 in connection with the speaker and microphone device wireless radio system 299 and wireless chipset 298. The speaker and microphone device wireless radio system 299 and wireless chipset 298 may further operate to perform various types of handshakes or encryption/decryption using various public keys, private keys, hashing algorithms, short-term keys, long-term keys, or encryption/decryption algorithms stored in the shared pairing or wireless communication profiles. Via the speaker and microphone device wireless radio system 299, in an embodiment, the microcontroller chip 250 may execute code instructions 254 of audio device switching control system 240 to receive a known socket address or location, for example a Bluetooth® socket, at which the information handling system 200 may established a first or second active audio data stream, and to establish a wireless link between the information handling systems 200 and 201 and the wireless speaker and microphone device 230 at the known address or location of one or more communication sockets at those information handling systems 200 or 201. Any or all of the above may be included in a pairing or wireless communication profiles relating to the first pairing or wireless coupling between the wireless speaker and microphone device 230 and the first host information handling system 200 or the second host information handling system 201 respectively in various embodiments. Such pairing and wireless communication profiles may be stored in a memory 209 at the first wireless speaker and microphone device 230.

In an embodiment, instructions 254 may be the audio device switching control system 240 executed by the microcontroller chip 250 to receive a signal of an available second active audio data stream. The audio device switching control system 240 then prepares an audio, haptic or other indicator at the wireless speaker and microphone device 230 to indicate to the user of the available second active audio data stream from the second host information handling system 201 while the wireless speaker and microphone device 230 is interacting with and transceiving the first active audio data stream. In one embodiment, an audio indicator is provided to the user by inserting the audio indicator into the first active audio data stream with multiplexer 235. The inserted indicator may be a beep or series of beeps or any tone multiplexed into the first active audio data stream with multiplexer 235 in an embodiment. In another embodiment, the audio device switching control system 240 may provide a haptic command to activate a haptic actuator device, such as a piezo element, for a haptic response. In yet another embodiment, the audio device switching control system 240 may provide a visual response command to cause a light to illuminate or other visual indicator to be activated. Further, the audio device switching control system 240 in an embodiment, may also provide an indicator signal through the signaling channel via either or both host information handling systems 200 or 201 to provide a visual, haptic or audio indicator at the particular host information handling system 200, 201. In a particular example embodiment, an indicator signal of an available second active audio data stream may be transmitted by the audio device switching control system 240 via wireless link with the first host information handling system 200. This indicator signal may cause the first host information handling system 200 to display an notice on a display device, provide a haptic feedback via a haptic actuator, or play a tone via a speaker indicating to the user the available second active audio data stream from the second host information handling system 201.

In a further embodiment, instructions 254 of the audio device switching control system 240 executed by the microcontroller chip 250 may be executed to receive a selection of whether to switch from a first active audio data stream for playback or interaction with the speaker 231 or microphone 211 to a second active audio data stream that is available from the second host information handling system 201.

Upon receiving a selection to switch via input/output device 220, the audio device switching control system 240 may then issue a command to switch a switch 233 such that the received first active audio data stream from the first host information handling system is not played at speaker 231 or does not receive audio input from microphone 211. Switch 233 may be an analog switch or may be a digital switch. With the selection to switch received from the user via the input/output device 220, the audio device switching control system 240 may transmit a signal to the speaker and microphone device wireless radio system 299 and wireless chipset 298 to receive the second active audio data stream from the second host information handling system 201 in an embodiment. In one example embodiment, the audio device switching control system 240 may also transmit a signal to the second host information handling system 201 to allow the second active audio data stream or to begin transmission and reception of the same. For example, a signal may be sent to the second host information handling system to answer an incoming voice call or video conference and transceive the second active audio data stream of that voice call. The signaling from and to either the second host information handling system 201 as described or even any signaling with the first host information handling system 200 may occur via the wireless links with those respective information handling system 201, 200 via a signaling channel available under the protocols used for those wireless links (e.g., BT, BLE, proprietary wireless links, etc.).

When a switch instruction is received from a user at the wireless speaker and microphone device 230 from a capacitive touch button, a switch, button, voice command, or other user input/output device 220, then audio device switching control system 240 may transmit a switch command to the switch 233 to cease the first active audio data stream from linking to the speaker 231 and microphone 211 of the wireless speaker and microphone device 230 and link the second active audio data stream from the second established wireless link between the second host information handling system 201 to the speaker 231 and microphone 211 of the wireless speaker and microphone device 230. With this switch selection from the user, therefore, the first wireless speaker and microphone device 230 ceases interaction via the speaker 231 and microphone 211 with the transmission and reception of first active audio stream and replaces it with the second active audio data stream.

The speaker and microphone device wireless radio system 299 may provide connectivity of the wireless speaker and microphone device 230 to the first or second host information handling system 200, 201 via one or more dedicated wireless links. For example, the speaker and microphone device wireless radio system 299 may establish a first wireless link directly to the first host information handling system 200 and a second wireless link directly to the second host information handling system 201, or any number of additional wireless links to additional host information handling systems in an embodiment. Such wireless links may be established pursuant to the Bluetooth® or Bluetooth Low Energy (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) (e.g., 270) in which the wireless speaker and microphone device 230 may communicate wirelessly with the first host information handling system 200 and any other host information handlings systems such as the second host information handling system 201 paired to the PAN 270 using a Bluetooth® compliant pairing and wireless communication profile. The PAN in such an embodiment may communicate data between the information handling system 200, 201 and any wirelessly coupled wireless speaker and microphone device 230 over short distances using Ultra High Frequency (UHF) radio waves in the Industrial, Scientific, and Medical purposes bands (ISM bands) between 2.402 and 2.48 GHz. In other embodiments, the speaker and microphone device wireless radio system 299 may utilize a proprietary wireless communications protocol with the first or second host information handling systems 200, 201 via a dongle or radio system located thereon that may include a signaling channel via the wireless link among other features. For example, a proprietary wireless protocol at 2.4 GHz may be used in an embodiment. Any wireless protocol is contemplated that may establish a wireless link between a host information handling system 200, 201 and the wireless speaker and microphone device 230. For example, speaker and microphone device wireless radio system 299 may be capable of communication with the paired information handling system 200 or other wireless speaker and microphone devices such as 280 using a wireless link established using Near Field Communication (NFC), a Bluetooth® technology, private or public Wi-Fi, 5G WPAN systems or others for example. The speaker and microphone device wireless radio system 299 in an embodiment may be capable of communication between the wireless speaker and microphone device 230 and the first or second host information handling systems 200, 201 for communication with remote audio data streaming sources such as a call, virtual meeting, audio streaming service or the like via a network 270 (e.g., LAN, WLAN, WAN, WLAN) in some embodiments.

The speaker and microphone device wireless radio system 299 in an embodiment may transmit and receive information necessary to pair or otherwise wirelessly link the wireless speaker and microphone device 230 with the information handling system 200 or the second wireless speaker and microphone device 280, such as, for example, pairing or wireless communication profiles for the information handling system 200 under the Bluetooth® or Bluetooth Low Energy (BLE) protocols. Such pairing or wireless communication profiles may operate to identify the first wireless speaker and microphone device 230 or the second wireless speaker and microphone device 280 (e.g., using a cloned pairing and wireless communication profile received from the first wireless speaker and microphone device 230) as a device authorized to transceive data with the information handling system 200, as well as information sufficient to identify the first wireless speaker and microphone device 230, such as a Media Access Control (MAC) address, IP address. The pairing or wireless communication profiles in an embodiment may further store various types of information necessary to perform a handshake between the information handling system 200 and the wireless speaker and microphone device 230 or the second wireless speaker and microphone device 280 (using cloned pairing and wireless communication profiles received from the first wireless speaker and microphone device 230), such as various public keys, private keys, hashing algorithms, short-term keys, long-term keys, or encryption/decryption algorithms. Further, the speaker and microphone device wireless radio system 299 in an embodiment may establish a wireless link with the network 270 (e.g., Bluetooth® or Bluetooth PAN) to transceive streaming audio data, as described in greater detail herein.

The wireless speaker and microphone device 230 may, in some embodiments include a processor such as a central processing unit (CPU), a GPU, a Visual Processing Unit (VPU), or a hardware accelerator, microcontroller integrated circuits (e.g., 250) or hardware control logic or some combination of the same, such as when the wireless speaker and microphone device 230 is a laptop information handling system, earbuds, headphones, smart speaker or other device and those devices may have varying levels of processing resources. Any of the processing resources may operate to execute code that is either firmware or software code. Moreover, the wireless speaker and microphone device 230 may include memory such as memory 209, containing computer readable medium 252 storing instructions 254. Instructions 254 may include the audio device switching control system 240, operating system (OS) software, application software, BIOS software, or other software applications or drivers detectable by processors or embedded controller 250. The instructions 254 in an embodiment may reside completely, or at least partially, within the memory 209.

Information handling system 200 in an embodiment may be in communication via the speaker and microphone device wireless radio system 299 with the wireless speaker and microphone device 230 such as a wearable earbud hearing device or a wearable headset hearing device, as described in greater detail herein. The information handling system 200 in such an embodiment may operate on wired and wireless links to connect with the network 270 via a network Access Point (AP) or base station, as described in greater detail herein.

Memory 209 may contain computer-readable medium (not shown), such as RAM in an example embodiment. An example of memory 209 includes random access memory (RAM) such as static RAM (SRAM), dynamic RAM (DRAM), non-volatile RAM (NV-RAM), or the like, read only memory (ROM), another type of memory, or a combination thereof. Memory 209 may also comprise static memory containing computer-readable medium (not shown), such as NOR or NAND flash memory in some example embodiments. The instructions, parameters, and profiles 254 of the audio device switching control system 240 may be stored in memory 209 on a computer-readable medium 252 such as a flash memory or magnetic disk in an example embodiment.

Figure 3:
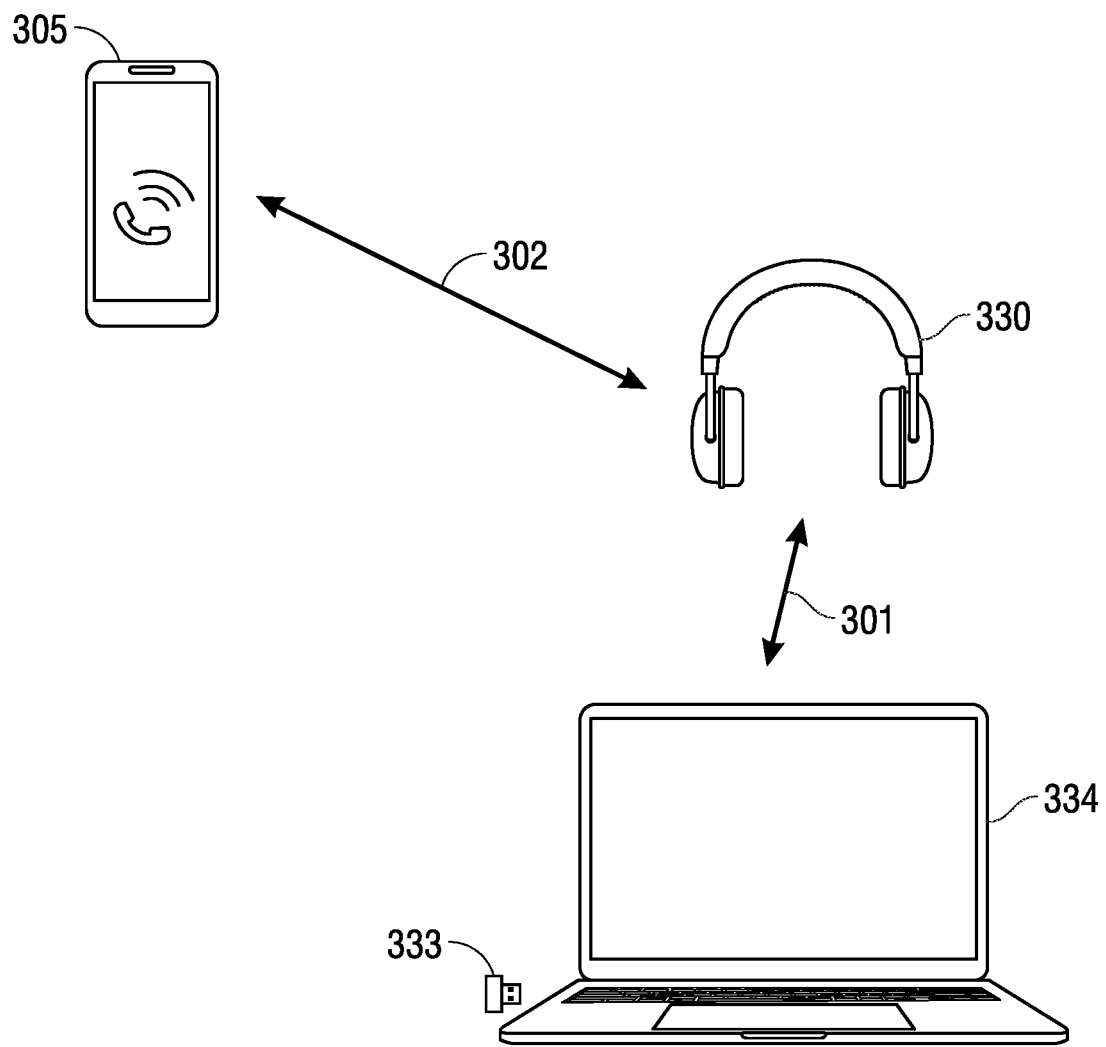
FIG. 3 is a graphical diagram illustrating a wireless speaker and microphone device wirelessly coupled to two host information handling systems according to an embodiment of the present disclosure.

FIG. 3 is a graphical diagram illustrating a wireless speaker and microphone device paired with a first and second host information handling system according to an embodiment of the present disclosure. FIG. 3 shows a state of wireless links and data communication according to an embodiment of the present disclosure. A wireless speaker and microphone device 330 (e.g., a headset) in an embodiment may pair or otherwise wirelessly couple via a first wireless link 301 with a first mobile information handling system 334 (e.g., a laptop computer) in an embodiment. Similarly, the wireless speaker and microphone device 330 (e.g., a headset) in an embodiment may also pair or otherwise wirelessly couple via a first wireless link 303 with a mobile information handling system 305 (e.g., smart phone) in an embodiment prior. The wireless speaker and microphone device 330 may be the headset as shown, or may be earbuds, a smart speaker, or other device as described in various embodiments herein. Wireless links 301 and 303 may be established under a plurality of protocols according to embodiments herein including the BT protocol, BLE protocol, a proprietary wireless protocol, a Wi-Fi wireless protocol, a 5G wireless protocol or others that may link a host information handling system 334, 305 and the wireless speaker and microphone device 330 in various embodiments.

Wireless links 301 and 303 may be established with the wireless speaker and microphone device 330 prior to transmission of any audio signals pursuant to a phone call, online meeting, audio streaming, or other active audio data stream via the mobile information handling system 334. For example, the wireless speaker and microphone device 330 in an embodiment may exchange pairing or wireless communication profiles with first information handling system 334 for the first pairing or wireless coupling for the first wireless link 301 as well as with the second mobile information handling system 305 for a second pairing or wireless coupling for the second wireless link 303. The first wireless speaker and microphone device 330 in such an embodiment may further perform various types of handshakes using various public keys, private keys, hashing algorithms, short-term keys, or long-term keys as a portion of such a pairing or wireless coupling procedure with the first and second mobile information handling system 334, 305. Any information required to perform such a handshake (e.g., public keys, private keys, hashing algorithms, short-term keys, or long-term keys) as well as information specifically identifying the first host information handling system 334 and the host information handling system 305 may be transmitted to the wireless speaker and microphone device 330. For example, in an embodiment a MAC addresses for the first host information handling system 334 may be stored at the wireless speaker and microphone device 330 as a pairing and wireless communication profile related to the first pairing for the first wireless link 301. First host information handling system is shown in one example embodiment establishing a wireless link 301 via a dongle 333 in one example embodiment and which may be a proprietary wireless protocol may be used to wirelessly couple to the wireless speaker and microphone device 330. For example, a proprietary 2.4 GHz wireless band may be used in one example embodiment for either wireless link 301 or 303. It is understood however that any wireless protocol may be used by the first host information handling system 334 and that a wireless network interface device with radio systems and antennas may also operate within the first host information handling system 334 without need for a dongle 333. For example, a BT or BLE wireless link may be used for either or both of wireless links 301 or 303 in some embodiments.

Following pairing or wirelessly coupling the wireless speaker and microphone device 330 with the first host information handling system 334 via wireless link 301 or the second mobile information handling system 305 via wireless link 303 in an embodiment, the wireless speaker and microphone device 330 may transmit and receive data including signal data for exchange of information or status for the wireless links. A signal channel may be available along each wireless link 301 and 303.

In an embodiment, an active audio data stream 302 may be established along wireless link 301 between the first host information handling system 334 and wireless speaker and microphone device 330. The first active audio data 302 stream may be transmitting and receiving data wirelessly for a videoconference call, an audio streaming service, a video soundtrack, gaming audio, or the like in various embodiments. Upon the wirelessly coupled second host information handling system 305 having an available second active audio data stream, for example an incoming voice call, the second host information handling system 305 may transmit a signal 304 on wireless link 303 to the wireless speaker and microphone device 330. At this point, the audio device switching control system executing at the wireless speaker and microphone device 330 may generate an indicator that may be audio, haptic, or visual. To generate an audio response in an embodiment, the audio device switching control system executing at the wireless speaker and microphone device 330 may insert a tone, beeps, or other audio indicator via a multiplexer into the first active audio data stream currently active on the speaker and microphone. In other embodiments, a haptic indicator command may actuate a haptic actuator or a visual indicator command may activate a visual feedback device at the wireless speaker and microphone device 330 to indicate the available second active audio data stream. In a further embodiment, the audio device switching control system may further transmit a signal via a signaling line on wireless link 301 to the first host information handling system 334 to provide a notification of an available second active audio data stream to a user via a display device, audio speaker, or haptic actuator located at the first host information handling system in some embodiments.

Figure 4:
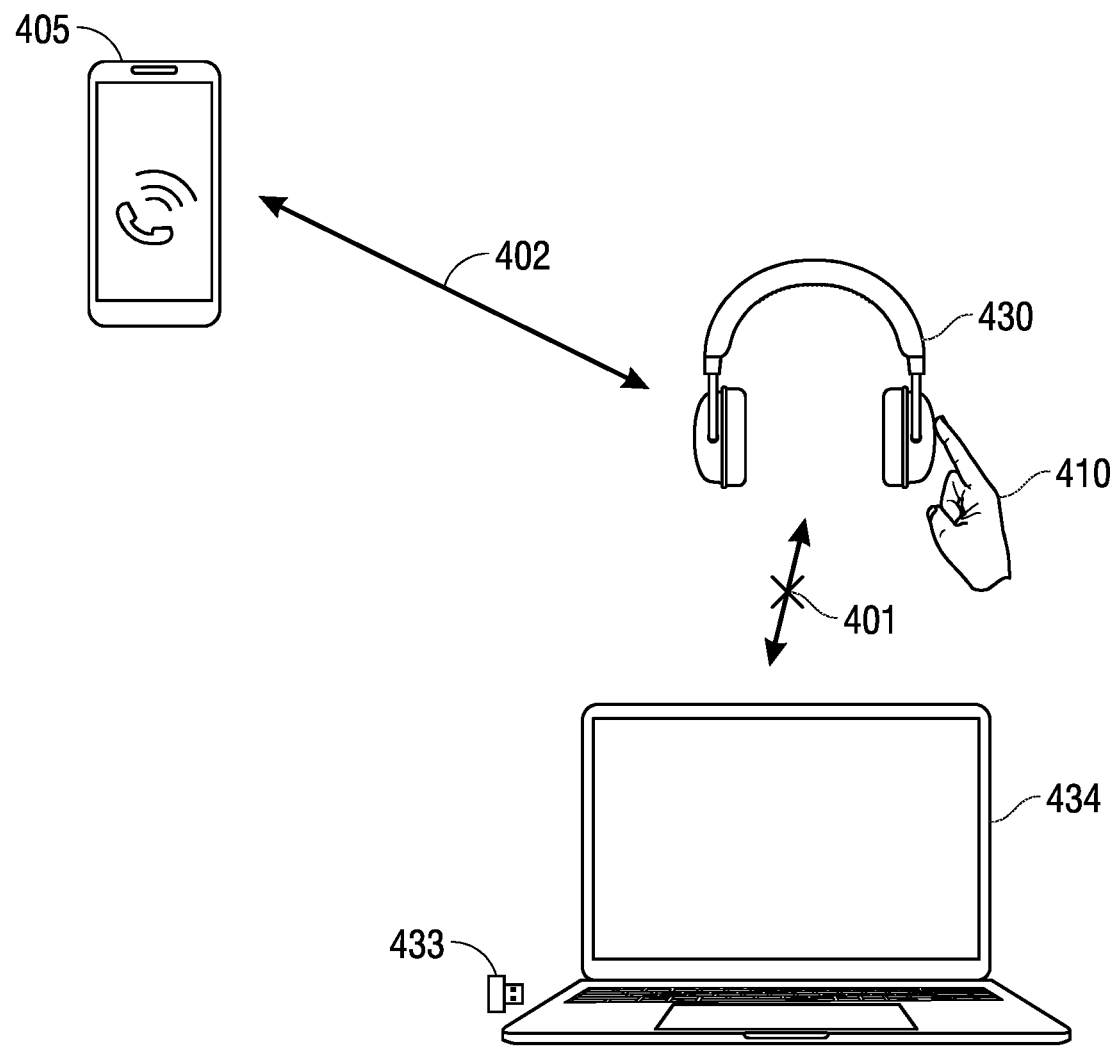
FIG. 4 is a graphical diagram illustrating a wireless speaker and microphone device wirelessly coupled to two host information handling systems according to an embodiment of the present disclosure.

FIG. 4 is a graphical diagram illustrating a wireless speaker and microphone device paired or wirelessly coupled with a first and second host information handling system according to another embodiment of the present disclosure. FIG. 4 shows another state of wireless links and data communication according to an embodiment of the present disclosure. The first host information handling system 434 may have ongoing transmission and reception via the first active audio data stream 402 on wireless link 401 with the wireless speaker and microphone device 430 an ongoing voice call or video conference, audio track of a video, audio for gaming or other software, audio streaming service or other according to an embodiment. For example, the first active audio data stream may comprise a phone call established via a cellular network, may comprise an online meeting (e.g., Zoom® meeting or Microsoft® Teams® meeting) established via the world-wide web, or may comprise music streamed from a local or network source.

The second host information handling system 405 may receive a second available audio data stream and may already be paired or otherwise wirelessly coupled with the wireless speaker and microphone device 430 (e.g., as described above) via a wireless link 403. As described, wireless links 401 and 403 may be via direct Bluetooth® or BLE wireless link, a proprietary wireless link or other wireless link protocols according to embodiments herein. Upon a second audio data stream becoming available at the second host information handling system 405 in an embodiment, the second host information handling system 405 may send a signal 404 to the wireless speaker and microphone device 430. For example, the second host information handling system 405 may receive an incoming voice call while the first host information handling system has an ongoing first active audio data stream 402. Instead of automatically interrupting that first active audio data stream 402 at the speaker and microphone of the wireless speaker and microphone device 430, a signal is received from the second host information handling system 405. The audio device switching control system receives the signal from the second host information handling system 405 about the available second audio data stream and generates an indicator, such as an audio, haptic, or visual indicator of the available second audio data stream.

Upon the user receiving indication of the second available audio data stream, the user may decide to accept the second available audio data stream or ignore or reject it in various embodiments. To accept or actively reject the available second audio data stream, the user may touch the headset to trigger a capacitive sensor, press one or more buttons, slide or toggle a switch or otherwise indicate a desire with respect to the available second audio data stream without or before interrupting the ongoing first active audio data stream 402. The user's hand 410 is shown in FIG. 4 touching the wireless speaker and microphone device 430, for example the headset, to provide a response. Other input/output devices such as a button, switch or other are contemplated on the wireless speaker and microphone device 430 as well for indication of a user's selection. A touch may indicate acceptance of the second audio data stream or rejection. Location of the touch or button may vary to provide one location for an acceptance indication and a second location for a rejection in one example embodiment. A type of touch or button press may indicate acceptance or rejection in other embodiments. For example, one touch to accept and two touches to reject or vice versa. In a basic embodiment, activation of a button or a capacitive touch may indicate acceptance of the second available audio data stream while the user may ignore the indicator to reject the same.

Upon receipt of an indication by the user to accept the second available audio data stream, the audio device switching control system at the wireless speaker and microphone device 430 may establish a second active audio data stream 404 with the second host information handling system 405. At the same time, the audio device switching control system at the wireless speaker and microphone device 430 may trigger a switch to disconnect the speaker and microphone at the wireless speaker and microphone device 430 from the first active audio data stream 402 to the second active audio data stream 404 in one embodiment. Thus, the audio device switching control system at the wireless speaker and microphone device 430 may begin transmission and reception for the incoming call or other second active audio data stream 404 using the speaker and microphone located there in an embodiment. In another embodiment, the audio device switching control system at the wireless speaker and microphone device 430 pause or end the first active audio data stream 402 on the first wireless link 401 when accepting the second active audio data stream 404. Selection of switching off the speaker/microphone but maintaining the first active audio data stream 402 versus pausing versus ending the first active audio data stream may be determined from a type of user input received via an input output device such as the capacitive touch switch or button or may be determined by the audio device switching control system based on the type of application providing the first active audio data stream. For example, if the first active audio data stream is streaming music audio or a video soundtrack, a signal may be sent to the first host information handling system to pause the playback in an embodiment. If the first active audio data stream 402 is an ongoing videoconference call, the first active audio data stream may be ongoing, but switched away from the speaker and microphone of the wireless speaker and microphone device 430 by the audio device switching control system in another example embodiment. If the first active audio data stream 402 is a gaming audio or web application audio, the first audio data stream 402 may be ended upon accepting the second active audio data stream 404 in another example embodiment. In other embodiments, one touch or button press received audio device switching control system at the wireless speaker and microphone device 430 may switch the speaker and microphone to the second active audio data stream 404 while maintaining first active audio data stream. Additional touches or button presses or a different type or location of the same may indicate a desire to pause or end the first active audio data stream 404 when accepting the second active audio data stream in some embodiments. As described with respect to FIG. 5 below, another, later actuation of an input/output device by user's hand 410 via a capacitive touch or button press, or a different location or button actuated, may cause the audio device switching control system to return the speaker and microphone at the wireless speaker and microphone device 430 to the first active audio data stream in some embodiments. Such a return to the first active audio data stream 402 may return to an ongoing first active audio data stream or may un-pause the first active audio data stream in various embodiments.

Figure 5:
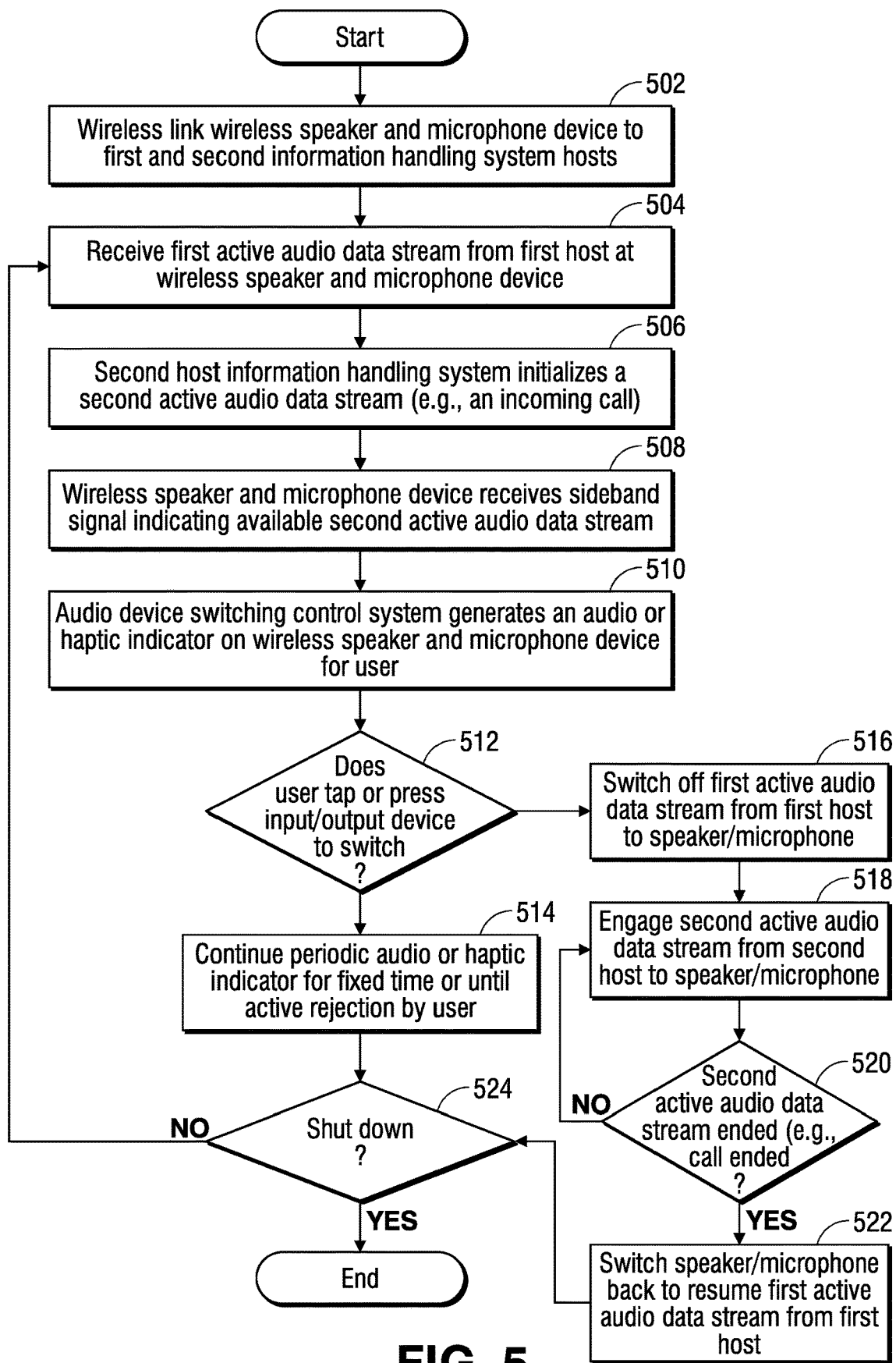
FIG. 5 is a flow diagram illustrating a method of wireless speaker and microphone device control among audio streams with plural, wirelessly coupled host information handling systems according to an embodiment of the present disclosure.

FIG. 5 is a flow diagram illustrating a method to utilize a peripheral wireless speaker and microphone device having plural uses and plural radios to be wirelessly linked to multiple host information handling systems to provide selection of active audio data streams for a user to receive or transmit at the peripheral wireless speaker and microphone device in an embodiment. When a first active audio data stream is established with a first mobile information handling system, for example, as a primary source of audio data streaming input and output for the peripheral wireless speaker and microphone device (e.g., earbuds or a headset), in some embodiments, a second mobile information handling system may become active. For example, an incoming call to a mobile smartphone may become active and seek to activate a wireless link with the peripheral wireless speaker and microphone device. The method below describes an audio device and switching control system operating at a peripheral wireless speaker and microphone device to provide the user switching control over transitioning between a first active audio data stream via a first wireless link with a first host information handling system and switching to a later, second active audio data stream via a second wireless link with a second host information handling system.

In the embodiments of the present disclosure, a second active audio data stream, such as an incoming call, from a host may be held off and a signal sent from the second host information handling system to the wireless speaker and microphone device. The signal from the second host information handling system provides for an indication to the user, such as a tone or haptic feedback on the wireless speaker and microphone device, that a second active data stream is available in an embodiment. This happens without the second active audio data stream causing an interruption with the first active audio data stream playing or live on the wireless speaker and microphone device. This provides the user with an opportunity to choose to interrupt the first active audio data stream and actively link to the second active audio data stream or to ignore the second active audio data stream and continue with the first active audio data stream via an input to the wireless speaker and microphone device. In an embodiment, this input may be via a capacitive touch, button, switch, or other input structure where the user may indicate a desire to switch to the second active audio data stream from a second host information handling system in various embodiments. Further, the audio device switching control system executing on the wireless speaker and microphone device may provide a user control as well to switch back from the second active audio data stream from the second host to the first active audio data stream from the first host. For example, the audio device switching control system may receive input from an input device on the wireless speaker and microphone device such as a capacitive switch, a button, or other switch to switch back to a first active audio data stream from the first host information handling system when an incoming call on the second active audio data stream has ended.

The wireless coupling between the wireless speaker and microphone device and the first or second host information handling systems may be via one or multiple wireless protocols. For example, a pairing and a wireless link may be conducted under a Bluetooth® (BT) or Bluetooth Low Energy (BLE) wireless protocol with one or either of the host information handling systems. In another example embodiment, a wireless coupling may be via a dongle on proprietary wireless communication link, via BT, via BLE, via Wi-Fi, or via a 5G wireless link between the wireless speaker and microphone device and one or either host information handling systems. Any wireless protocol may be supported and one or more radio systems for plural wireless protocols may be available on the wireless speaker and microphone device to support one or more wireless links with multiple host information handling systems in embodiments herein.

At block 502, the peripheral wireless speaker and microphone device may be paired or otherwise establish a wireless link with a first information handling system and with a second information handling system depending upon whether the wireless protocol with the peripheral wireless speaker and microphone device requires pairing in an embodiment. For example, in an embodiment described with reference to FIG. 3, above, the first information handling system 334 may pair or wirelessly couple via a BT protocol or a proprietary wireless protocol (such as with dongle 333) with a shared wireless speaker and microphone device 330 in an embodiment. First information handling system may establish pairing or wireless communication profiles with the shared peripheral wireless speaker and microphone device 330 to conduct a first pairing or otherwise establish a first wireless link 301 between them. The first mobile information handling system 334 and the shared wireless speaker and microphone device 330 in such an embodiment may further perform various types of handshakes using various public keys, private keys, hashing algorithms, short-term keys, or long-term keys as a portion of such a pairing procedure or to establish wireless link 301. In one example embodiment, the first mobile information handling system 334 may then establish a Bluetooth® or BLE wireless link 301 with the shared wireless speaker and microphone device 330 in an embodiment.

In a further embodiment described with reference to FIG. 3, above, the second information handling system 305 may pair or wirelessly couple via a BT protocol or a proprietary wireless protocol with the shared wireless speaker and microphone device 330 in an embodiment. First information handling system may establish pairing or wireless communication profiles with the shared peripheral wireless speaker and microphone device 330 to conduct a second pairing or otherwise establish or prepare to establish a second wireless link 302 between them. The second mobile information handling system 305 and the shared wireless speaker and microphone device 330 in such an embodiment may further perform various types of handshakes using various public keys, private keys, hashing algorithms, short-term keys, or long-term keys as a portion of such a pairing procedure or to establish wireless link 302. In one example embodiment, the first mobile information handling system 305 may then establish a sideband communication and be prepared to establish a Bluetooth® or BLE wireless link 302 with the shared wireless speaker and microphone device 330 in another embodiment.

As described in an embodiment with respect to FIG. 1, the wireless network interface device 160 of the mobile information handling system 100 in an embodiment may transmit and receive information necessary to pair the shared wireless speaker and microphone device 130 with the first or second information handling system 100 under a Bluetooth® or BLE protocol or other protocols as described in embodiments herein pursuant to execution by the processor 101 of code instructions 154 of the wireless communication device pairing system 140. Such information may include, for example, pairing or wireless communication profiles for the first or second information handling system 100 and the shared wireless speaker and microphone device 130. Such pairing or wireless communication profiles may operate to identify the shared wireless speaker and microphone device 130 and the first or second information handling system 100 as a device authorized to transceive data with the information handling system 100, as well as information sufficient to identify the first or second information handling systems 100 to the shared peripheral wireless speaker and microphone device 130, such as a Media Access Control (MAC) address, IP address. The pairing or wireless communication profiles in an embodiment may further store various types of information necessary to perform the handshake between the shared wireless speaker and microphone device 130 and either the first or second information handling systems 100 described above, such as various public keys, private keys, hashing algorithms, short-term keys, long-term keys, or encryption/decryption algorithms.

As described in an embodiment with respect to FIG. 2, shared speaker and microphone device wireless radio system 299 of the wireless speaker and microphone device 230 in an embodiment may transmit and receive information necessary to pair the shared wireless speaker and microphone device 230 with the first host information handling system 200 in a first pairing and to pair the shared wireless speaker and microphone device 230 with the second host information handling system 201 in a second pairing under a Bluetooth® or BLE protocol or other protocols as described herein.

At block 504, the shared wireless speaker and microphone device may actively receive a first active audio data stream via the first wireless link from the first host. For example, as described with reference to FIG. 3, the pairing or wireless communication profiles received from the first host information handling system 334 are used to establish a first wireless link 301. On that wireless link 301, a streaming active audio data stream may be transmitted to or received from the shared wireless speaker and microphone device 330. For example, the first host information handling system 334 may be transmitting an audio data stream for a streaming audio service or as a portion of a sound track for a video or movie being watched on the first host information handling system. In another embodiment, first host information handling system 334 may operate a video conference call and provide a streaming audio data stream via wireless link 301 to shared wireless speaker and microphone device 330. In an embodiment, the first host information handling system 334 and the shared wireless speaker and microphone device 330 transit and receive a first active audio data stream between them on the first wireless link 301 that is a proprietary WPAN wireless link such as at a 2.4 GHz wireless link. In other embodiments, the first wireless link 301 may be a Bluetooth®, BLE, near-field wireless link, or other wireless link.

Proceeding to block 506, the second host information handling system, may receive an incoming call or be started automatically or manually to begin a software application involving an active audio data stream. For example, with reference to FIG. 3, the second host information handing system 305, may be a mobile smartphone that receives an incoming telephone call. The second host information handling system 305 may initialize a wireless link 302 with shared wireless speaker and microphone device 330 to provide a second active audio data stream to the shared wireless speaker and microphone device 330. In an embodiment, the second host information handling system 305 and the shared wireless speaker and microphone device 330 may pre-establish a second wireless link 302 that a Bluetooth® or BLE wireless link. In other embodiments, the second wireless link 302 may be proprietary WPAN wireless link such as at a 2.4 GHz wireless link, near-field wireless link, or other wireless link. The second wireless link 302 may be capable of a sideband communication prior to fully engaging the second wireless link 302 to transmit and receive a second active audio data stream.

At block 508, the shared wireless speaker and microphone device may receive an incoming available audio data stream signal on a sideband control data link in a second wireless link established with a second host information handling system. Referring again to FIG. 3, the shared wireless speaker and microphone device 330 may receive the incoming available audio data stream signal on a sideband portion of the second wireless link 302. In an example embodiment, the shared wireless speaker and microphone device 330 may receive an incoming call signal from a second host information handling system 305 that is a smart phone. The audio device switching control system executing on an MCU or other controller on the shared wireless speaker and microphone device 330 may receive the incoming available audio data stream signal, for example the incoming call signal.

Proceeding to block 510, upon receiving a sideband signal indicating the incoming available audio data stream signal on the second wireless link from the second host information handling system, the audio switching control system may generate an audio indicator or haptic indicator to be played or actuated on the shared wireless speaker and microphone device. In one example embodiment, the audio switching control system executing on the controller may generate an audio indicator, such as a beep or series of beeps, and feed that audio indicator to the speaker device on the shared wireless speaker and microphone device. Referring to FIG. 2, the microcontroller chip 250 or other processing resource on the shared wireless speaker and microphone device 230 executes the audio device switching control system 240 to generate the audio indicator and feed it to speaker 231 via a multiplexer (MUX) 235. MUX 235 multiplexes the audio indicator in with the first active audio data stream playing on the speaker 231 that is being received via the first wireless link from a first host information handling system. In another embodiment, the microcontroller or other processing resource 250 may drive an I/O device 220 that is a haptic actuator, such as a piezo actuator or a linear resonating actuator, for a haptic indicator upon receiving the sideband incoming available audio stream signal from the second wireless link and the second host information handling system.

Proceeding to block 512, the user of the shared wireless speaker and microphone device may be notified by an audio indicator, haptic indicator, or other indicator of the incoming available audio data stream signal received from the second wireless link and second host information handling system. In an embodiment, upon hearing or otherwise sensing the audio indicator, such as a beep or series of beeps, or feeling or hearing a haptic indicator, this may prompt the user to respond with a selection of whether to receive the incoming second audio data stream or to continue with the first active audio data stream. Referring to FIG. 2, the shared wireless speaker and microphone device 230 may further include another I/O device 220 that may be a capacitive touch sensor or another type of switch or button in some embodiments. In one embodiment, the user may touch the shared wireless speaker and microphone device 230 housing to be detected by the capacitive touch sensor as a user input. In another embodiment, a switch or button on the shared wireless speaker and microphone device 230 may be actuated by the user as user input in response to the audio or haptic indicator of an incoming available second audio data stream.

In one example embodiment, if the user touches the shared wireless speaker and microphone device 230 housing and capacitive touch sensor or actuates a switch or button, this may be user input which may be sent to the microcontroller chip 250. In an example embodiment, any user input received at the audio device switching control system 240 may indicate a desire by the user to switch the speaker 231 and microphone 211 to the second audio data stream from the second host information handling system. The above is just an example of user input that may be received at the shared wireless speaker and microphone device 230. In other embodiments, the user may provide a plurality of user inputs by, for example, touching the shared wireless speaker and microphone device 230 housing, a switch/button thereon, or another I/O device once to accept the second incoming active audio data stream from the second wireless link or touch the shared wireless speaker and microphone device 230, a switch/button thereon, or another I/O device twice to reject the second incoming active audio data stream and continue with the first active audio data stream. It is contemplated that any combination of touches or touch types or combination of I/O devices may be used and sent to the audio device switching control system 240 to provide an option to a user to issue an "accept" user input to accept the second incoming audio data stream or to issue a "reject" user input to reject the same and continue with the first active audio data stream in various embodiments.

If the user does not accept the second incoming audio data stream at block 512, flow may proceed to block 514 with the audio device switching control system repeating the audio or haptic indicator of a second incoming audio data stream to the user. This may be repeated a limited number of times in an embodiment and may include a pause or delay between audio or haptic indicator episodes. The user may not accept the second incoming audio data stream at block 512 by not responding, or by touching a capacitive touch sensor, a switch, or a button in a way that is different from an accept user input in the example embodiment. If the user does not respond, at block 514 the audio or haptic indicator of the second incoming audio data stream may be repeated. The microcontroller integrated circuit will maintain a timer to determine when to provide another audio or haptic indicator in an embodiment. Further, the microcontroller integrated circuit will maintain a timer to determine when a limited time period has expired since a first notification of the incoming available second audio data stream to the user. Upon expiration of this limited time period, the microcontroller integrated circuit will deem this expiration as a rejection of the second audio data stream on the second wireless link in an embodiment. In an embodiment, the microcontroller integrated circuit and the audio device switching control system may send a signal to the second host information handling system indicating rejection of the second incoming available audio data stream. This rejection signal may be sent on a sideband command signal to the second host information handling system in an embodiment.

It is contemplated, however, that a user may select, by touch or actuating a switch or button, an active reject user input as described. In this embodiment where an active reject user input is received, the audio device switching control system may end the audio or haptic indicator of the second incoming audio data stream. In some embodiments, the audio device switching control system may issue a different audio or haptic indicator to acknowledge the rejection of the second incoming audio data stream. This rejection audio or haptic indicator may be played or provided to the user via the speaker or a haptic actuator to confirm the rejection of the second incoming audio data stream. As described, the microcontroller integrated circuit and the audio device switching control system may then send a signal to the second host information handling system indicating rejection of the second incoming available audio data stream in an embodiment. This rejection signal may be sent on a sideband command signal to the second host information handling system in an embodiment. Then the flow may proceed to block 524 to determine if the shared wireless speaker and microphone device 230 is shut down. If so, the method may end. If not, flow may return to block 504 to continue receiving the first active audio data stream and to monitor for a second incoming audio data stream to proceed as described above.

If the user accepts the second incoming audio data stream at block 512, this may trigger the audio device switching control system switch off the first active audio data stream to the speaker and switch instead to the second audio data stream at block 516. Switching to the second audio data stream from the second wireless link may be signaled to the second host information handling system. Then the second host information handling system commences transmission and reception on the second wireless link thus establishing a second active audio data stream on the second wireless link. In an example embodiment, the audio device switching control system 240, upon receiving an accept user input, may actuate switch 233 to toggle the speaker 231 and microphone 211 to receive or send audio data on the second active audio data stream. This speaker 231 and microphone 211 data may then be received at or transmitting from the shared wireless speaker and microphone device radio system 299 and headset wireless chip 298 on the second wireless link. Upon doing so, the switch 233 ends the first active audio data stream feed from the first wireless link at the shared wireless speaker and microphone device radio system 299 to the speaker 231 and microphone 211. In some embodiments, the shared wireless speaker and microphone device 230 may continue to receive the first active audio data stream at the shared wireless speaker and microphone device radio system 299 to return to later. In other embodiments, the user may have an option to end the first active audio data stream after switching.

The switching replaces the first active audio data stream instead with the second active audio data stream feed from the second wireless link. In an embodiment, the first and second wireless links may be of a same wireless protocol as linked and managed by the shared wireless speaker and microphone device radio system 299 and headset wireless chip 298. In other embodiments, the first and second wireless links may be of different wireless protocols as linked and managed by the shared wireless speaker and microphone device radio system 299 and headset wireless chip 298.

Proceeding to block 518, the audio device switching control system on the shared wireless speaker and microphone device 230 may send a signal, via the shared wireless speaker and microphone device radio system 299, such as via a command sideband signal, to the second host information handling system to engage the incoming second audio data stream as a second active audio data stream and transceive the same on the second wireless link. The second host information handling system may then transmit or receive on the second active audio data stream. For example, the second active audio data stream may be a phone call in the example embodiment.

At block 520, the audio device switching control system may monitor for an end to the second active audio data stream that is being transceived via the second wireless link on the shared wireless speaker and microphone device radio system 299. If the second active audio data stream had not ended, flow may return to block 518 to continue with the second active audio data stream being streamed to the speaker and microphone. If the second active audio data stream had ended, flow may proceed to block 522.

At block 522, the audio device switching control system may then switch back to the first active audio data stream if the first audio data stream has not been ended. Referring to FIG. 2, the audio device switching control system 240 executing on the microcontroller chip 250 or other processing resource may access the switch 233 to re-engage the first audio data steam as a first active audio data stream from the shared wireless speaker and microphone device radio system 299 to the speaker 231 and microphone 211. Upon switching back to the first active audio data stream or determining that the first active audio data stream is ended, flow may proceed to block 524. Again, at block 524 the system may determine if the shared wireless speaker and microphone device is shut down. If so, the method may end. If not, flow may return to block 504 to continue receiving the first active audio data stream and to monitor for a second incoming audio data stream to proceed as described above.

The blocks of the flow diagram of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless speaker and microphone device paired with a plurality of host information handling systems comprising:
   a microphone and a speaker;
   a wireless speaker and microphone device radio system establishing a first wireless link with a first host information handling system for wireless communications and establishing a second wireless link with a second host information handling system;
   a microcontroller integrated circuit executing code instructions of an audio device switching control system to operatively couple the speaker and the microphone to the first host information handling system to receive a first active audio data stream on the first wireless link;
   the microcontroller integrated circuit to receive a sideband signal on the second wireless link indicating an incoming available second audio data stream;
   the microcontroller integrated circuit indicating the incoming available second audio data stream on the second wireless link to a user of the wireless speaker and microphone device via an audio indicator played at the speaker or a haptic indicator generated at a haptic feedback device;
   an input/output device to receive an accept user input; and
   the microcontroller integrated circuit switching the speaker and the microphone to the second wireless link upon receipt of the accept user input and sending a signal to the second host information handling system to activate the second audio data stream on the second wireless link.

2. The wireless speaker and microphone device of claim 1, wherein at least the first wireless link or the second wireless link is a Bluetooth® wireless link.

3. The wireless speaker and microphone device of claim 2, wherein at least the other of the first wireless link or the second wireless link is a wireless protocol other than a Bluetooth® wireless link.

4. The wireless speaker and microphone device of claim 1, wherein the wireless speaker and microphone device is a headset device.

5. The wireless speaker and microphone device of claim 1 further comprising:
   the input/output device to receive the accept user input is a capacitive touch sensor to receive a touch on the wireless speaker and microphone device.

6. The wireless speaker and microphone device of claim 1 further comprising:
   the input/output device also receives a reject user input that is a different user input from the accept user input.

7. The wireless speaker and microphone device of claim 5 further comprising:
   the microcontroller integrated circuit maintaining the speaker and the microphone operatively coupled to the first wireless link upon receipt of the reject user input and sending a signal to the second host information handling system to reject the second audio data stream on the second wireless link.

8. The wireless speaker and microphone device of claim 1 further comprising:
   the microcontroller integrated circuit maintaining the speaker and the microphone operatively coupled to the first wireless link upon receiving no user input and after a limited time period expires sending a signal to the second host information handling system to reject the second audio data stream on the second wireless link.

9. The first wireless speaker and microphone device of claim 1 further comprising:
   a multiplexer to integrate an audio indicator to the speaker playing the first active audio data stream from the microcontroller unit to the user of an indication that the incoming available second audio data stream is available on the second wireless link.

10. A wireless speaker and microphone device paired with a plurality of host information handling systems comprising:
    a microphone and a speaker;
    a wireless speaker and microphone device radio system establishing a first wireless link with a first host information handling system for wireless communications and establishing a second wireless link with a second host information handling system;
    a microcontroller integrated circuit executing code instructions of an audio device switching control system to operatively couple the speaker and the microphone to the first host information handling system to receive a first active audio data stream on the first wireless link;
    the microcontroller integrated circuit to receive a sideband signal on the second wireless link indicating an incoming available second audio data stream;
    the microcontroller integrated circuit generating an audio indicator to a user of the wireless speaker and microphone device of the incoming available second audio data stream on the second wireless link;
    an audio multiplexer to integrate the audio indicator to the speaker playing the first active audio data stream for an indication that the incoming available second audio data stream is available on the second wireless link;
    an input/output device to receive an accept user input; and
    the microcontroller integrated circuit switching the speaker and the microphone to the second wireless link upon receipt of the accept user input and sending a signal to the second host information handling system to activate the second audio data stream on the second wireless link.

11. The wireless speaker and microphone device of claim 10, wherein at least one of the first wireless link or the second wireless link is a Bluetooth® Low Energy (BLE) wireless link.

12. The wireless speaker and microphone device of claim 10, wherein the wireless speaker and microphone device is a pair of earbuds.

13. The wireless speaker and microphone device of claim 10 further comprising:
the input/output device to receive the accept user input is a capacitive touch sensor to receive a touch on the wireless speaker and microphone device.

14. The wireless speaker and microphone device of claim 10 further comprising:
the input/output device also receives a reject user input that is a different user input from the accept user input.

15. The wireless speaker and microphone device of claim 14 further comprising:
the microcontroller integrated circuit maintaining the speaker and the microphone operatively coupled to the first wireless link upon receipt of the reject user input and sending a signal to the second host information handling system to reject the second audio data stream on the second wireless link.

16. The wireless speaker and microphone device of claim 10 further comprising:
the microcontroller integrated circuit maintaining the speaker and the microphone operatively coupled to the first wireless link upon receiving no user input and after a limited time period expires sending a signal to the second host information handling system to reject the second audio data stream on the second wireless link.

17. A wireless speaker and microphone device paired with a plurality of host information handling systems comprising:
a microphone and a speaker;
a wireless speaker and microphone device radio system establishing a first wireless link with a first host information handling system for wireless communications and establishing a second wireless link with a second host information handling system;
a microcontroller integrated circuit executing code instructions of an audio device switching control system to operatively couple the speaker and the microphone to the first host information handling system to receive a first active audio data stream on the first wireless link;
the microcontroller integrated circuit to receive a sideband signal on the second wireless link indicating an incoming available second audio data stream;
the microcontroller integrated circuit generating an audio indicator to a user of the wireless speaker and microphone device of the incoming available second audio data stream on the second wireless link;
an audio multiplexer to integrate the audio indicator to the speaker playing the first active audio data stream for an indication that the incoming available second audio data stream is available on the second wireless link;
a capacitive touch input/output device to receive an accept user input via a touch on a housing of the wireless speaker and microphone device; and
the microcontroller integrated circuit switching the speaker and the microphone to the second wireless link upon receipt of the accept user input and sending a signal to the second host information handling system to activate the second audio data stream on the second wireless link.

18. The wireless speaker and microphone device of claim 17 further comprising:
the capacitive touch input/output device also receives a reject user input that is a different user input from the accept user input.

19. The wireless speaker and microphone device of claim 18 further comprising:
the microcontroller integrated circuit maintaining the speaker and the microphone operatively coupled to the first wireless link upon receipt of the reject user input and sending a signal to the second host information handling system to reject the second audio data stream on the second wireless link.

20. The wireless speaker and microphone device of claim 17 further comprising:
the microcontroller integrated circuit maintaining the speaker and the microphone operatively coupled to the first wireless link upon receiving no user input and after a limited time period expires sending a signal to the second host information handling system to reject the second audio data stream on the second wireless link.

* * * * *